(12) United States Patent
Thomsen et al.

(10) Patent No.: US 7,631,590 B2
(45) Date of Patent: Dec. 15, 2009

(54) HYDRAULIC STEERING ARRANGEMENT

(75) Inventors: Svend Erik Thomsen, Nordborg (DK); Niels Bjarne Hansen, Aabenraa (DK)

(73) Assignee: Sauer-Danfoss Aps, Nordborg (DK)

( * ) Notice: Subject to any disclaimer, the term of this patent is extended or adjusted under 35 U.S.C. 154(b) by 275 days.

(21) Appl. No.: 11/714,424

(22) Filed: Mar. 6, 2007

(65) Prior Publication Data
US 2008/0105485 A1 May 8, 2008

(30) Foreign Application Priority Data
Nov. 2, 2006 (DE) .................. 10 2006 051 541

(51) Int. Cl.
*F01B 25/02* (2006.01)
*F16D 31/02* (2006.01)
(52) U.S. Cl. .............................. 91/6; 60/384
(58) Field of Classification Search ............... 60/384, 60/385, 386, 387; 91/6
See application file for complete search history.

(56) References Cited

U.S. PATENT DOCUMENTS

| | | |
|---|---|---|
| 3,394,545 A | 7/1968 | Thompson et al. |
| 3,996,838 A | 12/1976 | Goff .................. 91/32 |
| 4,215,720 A | 8/1980 | Becker |
| 4,311,006 A | 1/1982 | Becker |
| 4,736,811 A | 4/1988 | Marsden et al. |
| 5,234,070 A | 8/1993 | Noah et al. |
| 5,511,457 A | 4/1996 | Hawkins et al. ............ 91/6 |
| 6,490,861 B2* | 12/2002 | Biggi et al. .............. 60/384 |

FOREIGN PATENT DOCUMENTS

GB        1355955        6/1974

OTHER PUBLICATIONS

Co-pending U.S. Appl. No. 11/714,510 entitled "Hydraulic Steering" filed Mar. 6, 2007.
Co-pending U.S. Appl. No. 11/714,364 entitled "Hydraulic Steering" filed Mar. 6, 2007.
Co-pending U.S. Appl. No. 11/714,419 entitled "Hydraulic Steering" filed Mar. 6, 2007.

* cited by examiner

*Primary Examiner*—Michael Leslie
(74) *Attorney, Agent, or Firm*—McCormick, Paulding & Huber LLP

(57) ABSTRACT

The invention concerns a hydraulic steering arrangement (1) with a supply connection arrangement (P, T), a working connection arrangement (A, B) connectable to a steering motor (5), a steering unit (6) located between the supply connection arrangement (P, T) and the working connection arrangement (A, B), and a steering valve (14) whose outlet is connected to the working connection arrangement (A, B). It is endeavored to keep the load of such a steering arrangement small. For this purpose, the steering unit (6) is made as an open-center steering unit, an inlet (20) of the steering valve (14) being connected to a pressure supply arrangement (22) that can be activated by an activation of the steering valve (14).

18 Claims, 3 Drawing Sheets

HYDRAULIC STEERING ARRANGEMENT

CROSS REFERENCE TO RELATED APPLICATIONS

Applicant hereby claims foreign priority benefits under U.S.C. § 119 from German Patent Application No. 10 2006 051 541.2 filed on Nov. 2, 2006, the contents of which are incorporated by reference herein.

FIELD OF THE INVENTION

The invention concerns a hydraulic steering arrangement with a supply connection arrangement, a working connection arrangement connectable to a steering motor, a steering unit located between the supply connection arrangement and the working connection arrangement, and a steering valve whose outlet is connected to the working connection arrangement.

BACKGROUND OF THE INVENTION

With such a steering, it is possible to steer a vehicle in two different manners, either via the steering unit or via the steering valve. In many cases the vehicle can also be steered using both steering unit and steering valve at the same time. A steering unit is here understood to be a hydro-mechanical steering unit, which can be activated by a steering handwheel or a similar arrangement. Such a steering unit has a directional section and a measuring motor section, so that the measuring motor connected to the working connection arrangement can be supplied with a certain amount of hydraulic fluid having the right direction. The steering valve, however, is activated either directly or indirectly via a joy-stick or another arrangement. It merely controls the throughput of hydraulic fluid to the steering motor, without being reset by a measuring motor section.

To ensure that the steering motor can be controlled by both the steering unit and the steering valve, they both have to be connected to the supply connection arrangement. Accordingly, both arrangements are permanently exposed to the pressure of the hydraulic fluid supplied by the supply connection the pressure of the hydraulic fluid supplied by the supply connection arrangement. This causes a substantial load.

SUMMARY OF THE INVENTION

The invention is based on the task of restraining the load of the steering arrangement.

With a steering arrangement as mentioned in the introduction, this task is solved in that the steering unit is made as an open-center steering unit, an inlet of the steering valve being connected to a pressure supply arrangement that can be activated by an activation of the steering valve.

With such an embodiment it is prevented that the steering valve is permanently exposed to the pressure of the hydraulic fluid supplied to the supply connection arrangement. The pressure supply arrangement keeps the pressure away from the steering valve as long as the steering valve does not need the pressure. Not until the steering valve is activated, that is, put into operation, the pressure supply arrangement is activated and ensures that the steering valve is supplied with hydraulic fluid under a sufficient pressure, which can be passed on by the steering valve to the working connection arrangement. As long as the steering motor is activated via the steering valve, the pressure supply arrangement ensures that the required pressure is available. In this connection it may be ensured that the steering unit is relieved of the pressure when the steering valve is activated. However, it is also possible in this case to let the hydraulic pressure of the supply connection arrangement act upon both the steering unit and the steering valve.

Preferably, the pressure supply arrangement is located between the supply connection arrangement and the steering unit. In this case, the pressure supply arrangement can use the pressure from the supply connection arrangement and supply it to the steering valve on demand. When there is no demand from the steering valve, the pressure is kept away from the steering valve or the pressure to the steering valve is at least reduced.

In a simple embodiment this can be realised in that the pressure supply arrangement is located in a pressure pipe between the supply connection arrangement and the steering unit. In this case, the pressure supply arrangement can, for example, in a simple manner switch between the supply of the steering unit and the supply of the steering valve. When the pressure is supplied to the steering unit, the steering valve receives no pressure. When the steering valve receives the pressure, the steering unit receives no pressure.

In an alternative embodiment it may be ensured that the pressure supply arrangement is located in a tank pipe between the steering unit and the supply connection arrangement. This is particularly possible, when the steering unit is a so-called "open-center" steering unit, in which a short-circuiting between the pump inlet and the tank outlet of the steering unit is formed in the neutral position of the steering unit. The hydraulic fluid then flows through the steering unit and reaches the pressure supply arrangement with the required pressure, the pressure supply arrangement passing on this pressure to the steering valve.

Finally, it is also possible that the steering unit comprises a pressure inlet and, additionally to a control outlet connected to the working connection arrangement, also a loadable additional outlet, the pressure supply arrangement being connected to the additional outlet. Such a steering unit is also called a "power beyond" steering unit. One example of such a steering unit is disclosed in U.S. Pat. No. 3,996,838. The additional outlet is loadable with pressure, so that the required pressure can be supplied to the steering valve, also when the tank outlet itself of the steering unit is not loadable with a higher pressure.

Preferably, the steering valve and the steering unit have a common pressure control valve. Because the pressure of the supply connection arrangement is only supplied to either only the steering valve or only the steering unit or, on activation of the steering valve, to the steering valve and the steering unit, one single pressure control valve will be sufficient to protect both the steering unit and the steering valve from too high pressures. This simplifies the design.

Preferably, the pressure supply arrangement is a throttle valve, a pipe to the steering valve branching off in front of its inlet. When the throttle valve is throttling, the corresponding pressure builds up at its inlet, which can then be supplied to the steering valve. The throttling can be increased so much that the throttle blocks. Accordingly, in stead of the throttle valve a stop valve can be used, for example an on-off valve. To simplify the following description, such a stop valve will also be called throttle valve.

Preferably, the pressure supply arrangement can be activated by a load-sensing signal from the steering valve. In a manner of speaking, the steering valve itself picks up the pressure that it requires. When the steering valve is activated, the load-sensing signal, also called "LS-signal", receives a pressure that is sufficient to activate the pressure supply arrangement, for example the throttle valve mentioned above.

The throttle valve can then, for example, be displaced from a non-throttling position to a throttling or blocking position, so that the pressure from the supply connection arrangement reaches the inlet of the steering valve, from where it can be controlled further.

Preferably, the steering unit is connected to a change-over arrangement for changing over between a reaction and a non-reaction operation mode. Thus, it can be ensured that, for example, the steering unit does not turn the steering handwheel, that is, shows no reaction to the environment, when the steering motor is activated by the steering valve. This is a measure that both improves the safety of an operator in a steered vehicle and contributes to an improvement of the comfort.

Preferably, the change-over arrangement is located between the steering unit and the working connection arrangement. In the simplest case, it thus interrupts or releases a connection between the steering unit and the working connection arrangement. When the connection is interrupted, the steering unit shows no reaction to the operation mode of the steering motor.

Preferably, the change-over arrangement can be changed over to the non-reaction operation mode by an activation of the steering valve. In this case no additional measures are required to place the steering unit in a non-reaction state. On the contrary, the change over occurs automatically, when the steering valve is activated.

Preferably, the steering valve has a hydraulic actuator, a pilot controlled valve being located between the actuator and the supply connection arrangement. In this case an unwanted activation of the steering valve and thus an unwanted change over of the pressure supply arrangement is prevented. Not until the steering valve is actually activated a corresponding actuation pressure is made available for the steering valve.

BRIEF DESCRIPTION OF THE DRAWINGS

In the following, the invention is described on the basis of preferred embodiments in connection with the drawings, showing.

DETAILED DESCRIPTION OF THE INVENTION

Figure 1:
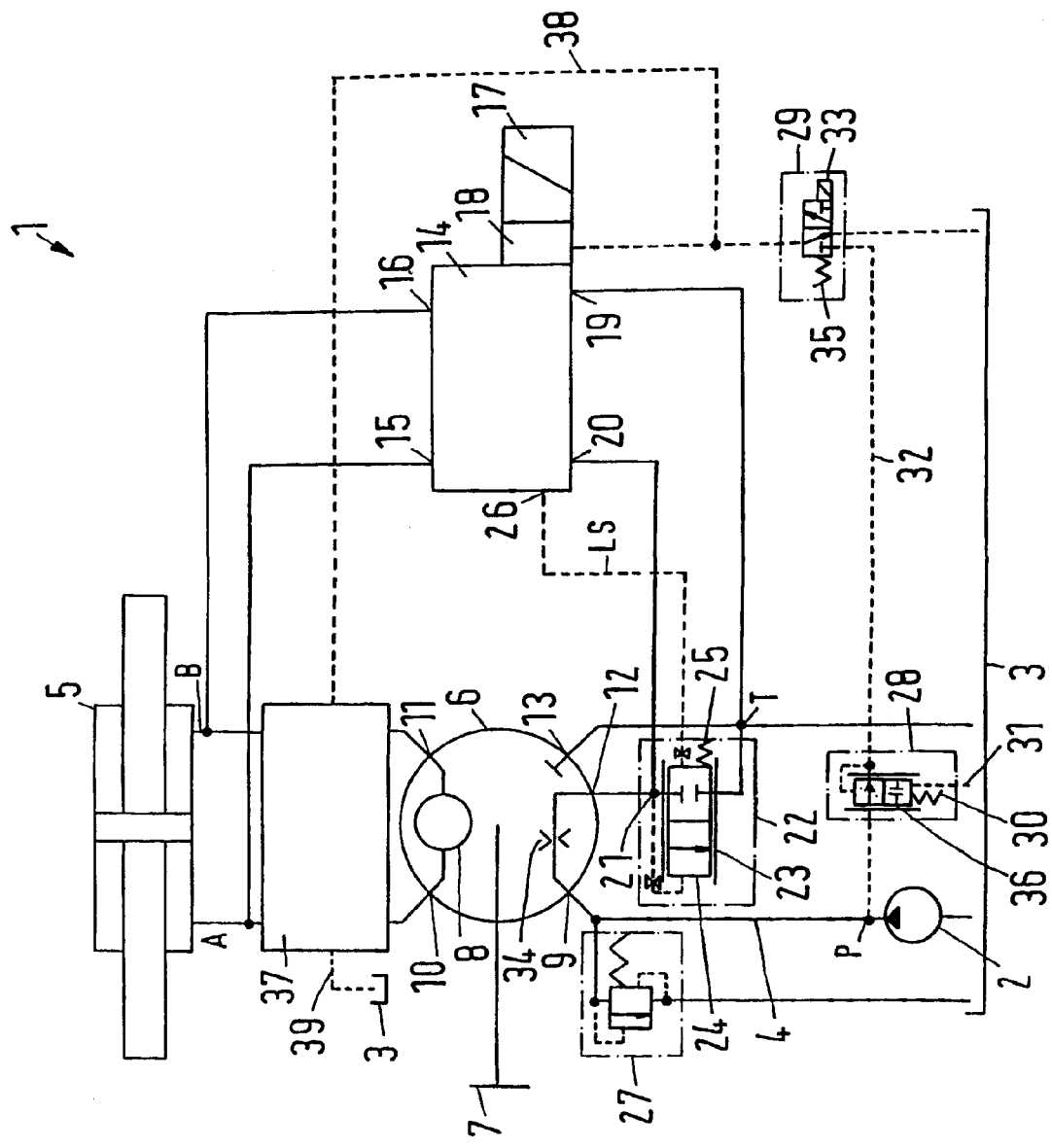
FIG. 1 is a schematic view of a steering arrangement.

FIG. 1 is a schematic view of a steering arrangement 1 comprising a supply connection arrangement with a pump connection P and a tank connection T as well as a working connection arrangement with two working connections A, B.

A schematically shown pump 2 and tank 3 are connected to the supply connection arrangement. The pump 2 supplies pressurized hydraulic fluid for the supply of the steering arrangement 1 into a pressure pipe that is connected to the pump connection P.

A steering motor 5 is connected to the working connections A, B of the working connection arrangement.

Between the supply connection arrangement P, T and the working connection A, B is located a steering unit 6 that can be activated by a steering handwheel 7. The steering unit 6 has a measuring motor section 8 that can be used as emergency steering pump when the pump 2 fails.

The steering unit 6 is a "power beyond" steering unit, that is, besides a pressure inlet 9 that is connected to the pump inlet P via a pressure pipe 4, and the two control outlets 10, 11 connected to the working connections A, B, it has an additional outlet 12, which practically carries the pressure ruling at the pressure inlet 9, at least in the neutral position of the steering unit 6. When the steering unit 6 is activated, a merely schematically shown throttle 34 is more heavily throttled, so that the pressure at the pressure inlet used to activate the steering motor 5 increases. Additionally, the steering unit 6 has a tank outlet 13.

The steering motor 5 can be activated by the steering unit 6 in that the steering handwheel 7 is turned in one direction or the other, as known per se.

The steering motor 5 can also be activated via a steering valve 14, whose outlets 15, 16 are connected to the working connections A, B. The steering valve 14 has a schematically shown electromagnetic control 17 that acts upon a hydraulic control device 18, which again activates the steering valve 14. The steering valve 14 can, for example, be a proportional valve with a slide. Such a steering valve is, for example, available under the name of PVG or EH from Sauer-Danfoss ApS, Nordborg, Denmark.

The steering valve 14 also has a tank outlet 19 that is connected to the tank connection T.

The steering valve 14 has an inlet 20 via which the pressure supply to the steering valve 14 shall take place. This inlet is connected to the additional outlet 12 of the "power beyond" steering unit 6. Or rather, the inlet 20 is connected to a point 21 between the additional outlet 12 and a pressure supply arrangement 22. In this case, the pressure supply arrangement 22 has a throttle valve 23 with a slide 24. The slide is pushed to a closing position against the force of a spring 25 acting in the closing direction, in which position the slide throttles or even blocks a passage between the additional outlet 12 and the tank connection T. In the opening direction the pressure at the point 21 and thus the pressure at the additional outlet 12 are acting.

When the throttle valve 23 is made so that the slide 24 throttles gradually, it is also possible to provide the throttle valve 23 with a second, not shown, outlet, to which a further consumer can be connected.

The steering valve 14 has a load-sensing outlet 26, which is connected via a pipe LS to the throttle valve 23 so that the pressure in the load-sensing pipe LS also acts upon the slide 24 in the closing direction.

The pressure inlet 9 of the steering unit 6 is connected to the tank 3 via a pressure control valve 27. The pressure control valve 27 is the only pressure control valve in the steering arrangement 1. It serves the purpose of limiting the pressure for both the steering unit 6 and the steering valve 14, as will be described below.

The pump connection P is connected to the hydraulic control device 18 of the steering valve 14 via a pilot valve 28 and an operation mode valve 29. The pilot valve 28 has a slide 36, which is acted upon in the closing direction by a spring 30 and, if required, by the pressure in a not described control inlet 31 (tank pressure) and in the opening direction by the pressure in a pipe 32 between the pilot valve 28 and the operation mode valve 29.

The operation mode valve 29 has an electromechanical actuator 33, which acts against the force of a spring 35.

The valves 28, 29 can also be combined to one valve that is controlled by an external valve or signal.

The steering arrangement 1 described above works as follows:

The pump connection P is supplied with hydraulic pressure by the pump 2. The pressure control valve 27 ensures that the pressure in the pressure pipe 4 cannot exceed a predetermined value, and the steering motor 5 is activated by the steering unit 6, that is, it is put into operation, when the steering handwheel 7 is turned in one direction or the other.

In the neutral position the pressure ruling at the pressure inlet 9 of the steering unit 6 also rules at the additional outlet 12, so that the slide 24 is moved into the opening position by the ruling pressure and the hydraulic fluid can flow off from the pressure inlet 9 to the tank connection T and thus to the tank 3. The steering unit 6 thus acts as an "open center" steering unit, that is, a steering unit with open center.

As the throttle valve 23 of the pressure supply arrangement 22 is open, practically a standby pressure rules at the point 21, whose value is determined by the spring 25, and the steering valve 14 is not supplied with a sufficient pressure. When the steering valve 14 is in the neutral position, however, this standby pressure is sufficient.

When, however, the steering motor 5 shall not be activated by the steering unit 6, but by the steering valve 14, the operation mode valve 29 is activated first. Because of the spring 35, the operation mode valve 29 is at first in a position, in which the hydraulic control 18 of the steering valve 14 is connected to tank. When the actuator 33 is activated, the pipe 32 is connected to the hydraulic control 18. Due to the existing connection of the hydraulic control 18 to the tank 3, the pipe 32 is practically pressureless, so that in the closing direction the slide 36 is no longer acted upon by a pressure, but can be pushed into the opening position by the spring 30. In this case, the pressure from the pump connection P reaches the hydraulic control 18. Thus, the steering valve 14 can be activated.

When the steering valve 14 is activated, the pressure at the load-sensing outlet 26 and thus also in the load-sensing pipe LS increases. Together with the force of the spring 25, this pressure is sufficient to displace the slide 24 of the throttle valve 23 in the pressure supply arrangement 22 into the closing position, so that the hydraulic fluid can no longer flow off from the point 21 into the tank 3. Therefore, a pressure builds up at the point 21 and thus also at the inlet 20 of the steering valve 14, which pressure is usually ruling at the additional outlet 12 of the steering unit 6. In the neutral position of the steering unit 6, as explained above, this is in principle the pressure at the pump connection P. The steering valve 14 is then able to activate the steering motor 5.

Figure 3:
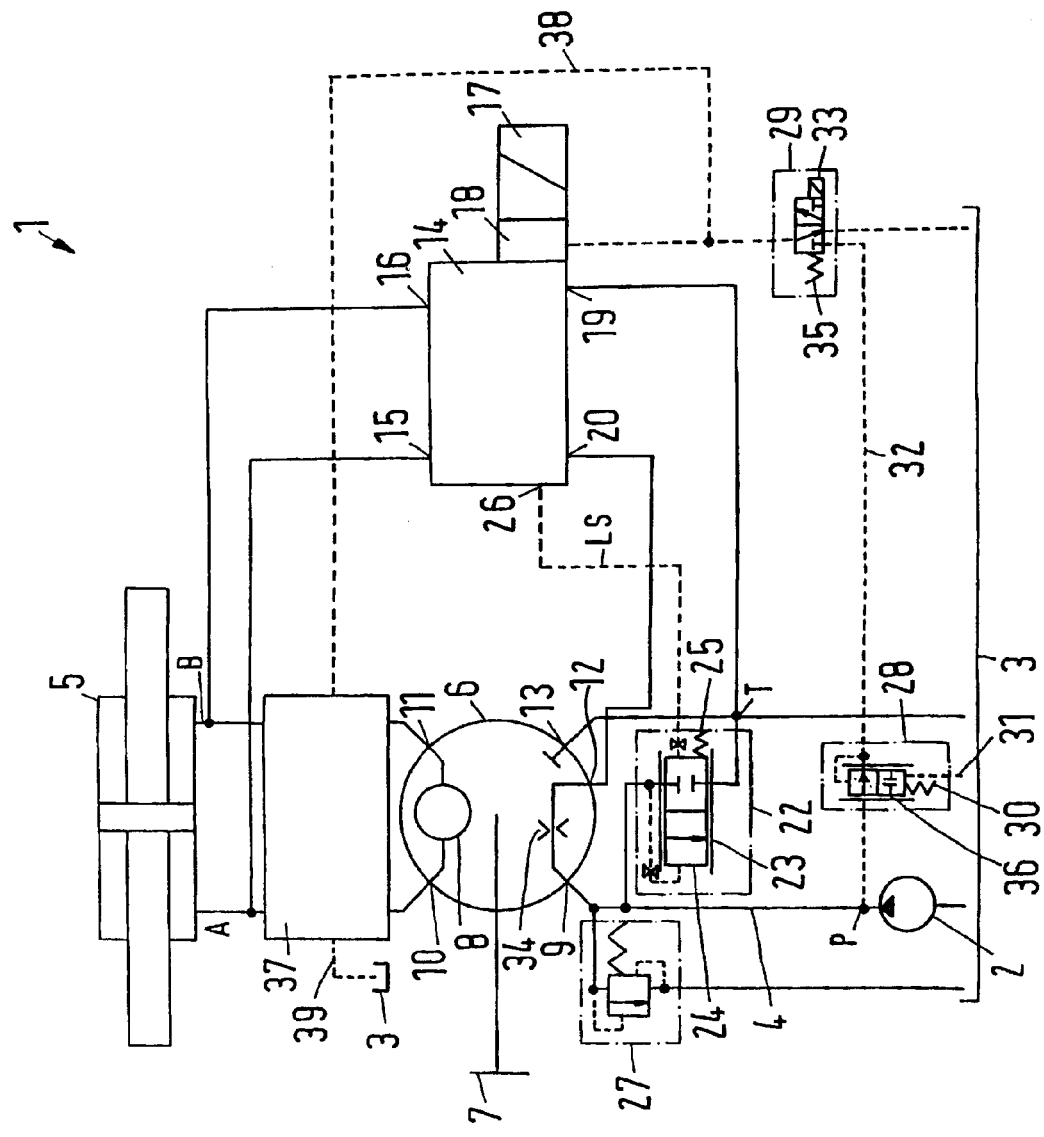
FIG. 3 a schematic view of a steering arrangement.

As shown in FIGS. 1 and 3, the pressure supply arrangement 22 can be connected to or located in the pressure pipe 4 or in the pipe to the tank connection.

Between the steering unit 6 and the working connection arrangement with the working connections A, B is located a change-over arrangement 37. The change-over arrangement 37 changes over between a reaction operation mode of the steering unit 6 and a non-reaction operation mode of the steering unit 6. In the reaction operation mode of the steering unit 6 a movement of the steering motor 5 is transferred to the steering handwheel 7. The driver holding the steering handwheel will thus become a feeling of the direction and the power of the force acting upon the steering motor. In the non-reaction operation mode this feedback of the steering motor 5 on the steering unit 6 and thus also on the steering handwheel 7 is discontinued. In the simplest case the change-over arrangement 37 creates a connection between the steering motor 5 and the measuring motor section 8 in the reaction operation mode, and interrupts this connection in the non-reaction operation mode.

The change-over arrangement 37 is activated, when the operation mode valve 29 changes over. For this purpose a control pipe 38 branches off between the operation mode valve 29 and the hydraulic control 18. To enable a feedback, a tank outlet of the change-over arrangement 37 is connected to the tank 3.

The fact that the change over between the two operation modes occurs automatically, when the steering valve 14 is activated, ensures that the steering handwheel does not move, when the steering motor 5 is activated via the steering valve 14.

Figure 2:
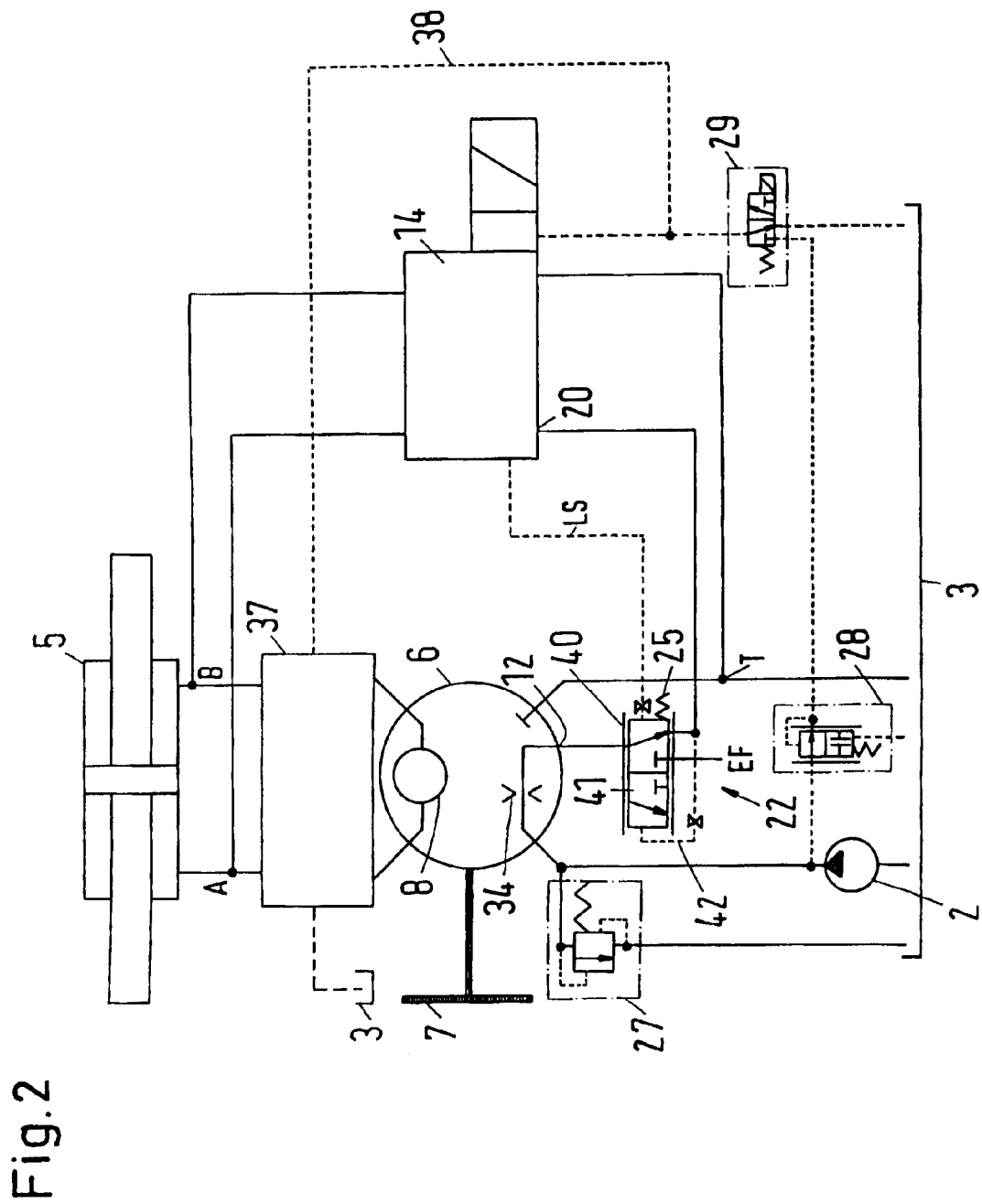
FIG. 2 is a modified embodiment of a steering arrangement.

FIG. 2 shows a modified embodiment of a hydraulic steering arrangement, in which the same parts as in FIG. 1 have the same reference numbers.

The only change concerns the pressure supply arrangement 22. In the embodiment according to FIG. 2 the pressure supply arrangement 22 is a priority valve 40. The priority valve 40 has a slide 41 connection in the position shown the additional outlet 12 with the inlet 20 of the steering valve 14. The slide 41 is pushed into this position by the load-sensing signal LS from the load-sensing outlet 26 of the steering valve 14, when the steering valve 14 is activated. Also the force of the spring 25 acts in this direction.

When the steering valve 14 requires no hydraulic fluid, the slide 41 is pushed by the pressure in a control pipe 42, which is connected to the inlet 20 of the steering valve 14 against the force of the spring 25 into a position, in which the additional outlet 12 of the steering unit 6 is connected to an outlet EF with lower priority of the priority valve 40. In this case, other hydraulic auxiliary equipment can be activated via the steering unit 6.

In both embodiments there are several opportunities of activating the change-over arrangement 37, thus causing a change-over between the operation modes "reaction" and "non-reaction". Shown is a hydraulic activation via the pipe 38.

However, it is also possible to arrange a sensor on the steering handwheel 7 or a part connected with the steering handwheel, for example the steering wheel column, said sensor registering turns of the steering handwheel 7. Also possible is a sensor in the measuring motor section 8, which registers, if the set of teeth located here is moving.

Also hydraulic signals can be evaluated. For example, the steering unit 6 could have an additional connection acted upon by pressure, when the steering unit 6 is activated. In this case, the same signal can be used for both steering directions. This pressure could originate from the pressure connection 9 or from one of the two directional connections 10, 11. Also possible are different kinds of differential pressure measurings, which could be either electrical or purely hydraulic. The pressure differences can, for example, be measured between the pressure inlet 9 and the additional outlet 12 or between the two directional connections 10, 11.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A hydraulic steering arrangement with a supply connection arrangement, a working connection arrangement connectable to a steering motor, a steering unit located between the supply connection arrangement and the working connection arrangement, and a steering valve whose outlet is connected to the working connection arrangement, wherein the steering unit is made as an open-center steering unit, an inlet of the steering valve being connected to a pressure supply arrangement that can be activated by an activation of the steering valve, wherein the pressure supply arrangement is located between the supply connection arrangement and the steering unit, wherein the steering unit comprises a pressure inlet and, additionally to a control outlet connected to the working connection arrangement, also a loadable additional outlet, the pressure supply arrangement being connected to the additional outlet.

2. The steering arrangement according to claim 1, wherein the pressure supply arrangement is located in a pressure pipe between the supply connection arrangement and the steering unit.

3. The steering arrangement according to claim 1, wherein the pressure supply arrangement is located in a tank pipe between the steering unit and the supply connection arrangement.

4. The steering arrangement according to claim 1, wherein the steering valve and the steering unit have a common pressure control valve.

5. A hydraulic steering arrangement with a supply connection arrangement, a working connection arrangement connectable to a steering motor, a steering unit located between the supply connection arrangement and the working connection arrangement, and a steering valve whose outlet is connected to the working connection arrangement, wherein the steering unit is made as an open-center steering unit, an inlet of the steering valve being connected to a pressure supply arrangement that can be activated by an activation of the steering valve wherein the pressure supply arrangement is a throttle valve, a pipe to the steering valve branching off in front of its inlet.

6. The steering arrangement according to claim 1, wherein the pressure supply arrangement can be activated by a load-sensing signal from the steering valve.

7. The steering arrangement according to claim 1, wherein the steering unit is connected to a change-over arrangement for changing over between a reaction and a non-reaction operation mode.

8. The steering arrangement according to claim 7, wherein the change-over arrangement is located between the steering unit and the working connection arrangement.

9. The steering arrangement according to claim 7 wherein the change-over arrangement can be changed over to the non-reaction operation mode by an activation of the steering valve.

10. The steering arrangement according to claim 1, wherein the steering valve has a hydraulic actuator, a pilot controlled valve being located between the actuator and the supply connection arrangement.

11. The steering arrangement according to claim 5, wherein the steering valve and the steering unit have a common pressure control valve.

12. The steering arrangement according to claim 5, wherein the steering unit is connected to a change-over arrangement for changing over between a reaction and a non-reaction operation mode.

13. A hydraulic steering arrangement with a supply connection arrangement, a working connection arrangement connectable to a steering motor, a steering unit located between the supply connection arrangement and the working connection arrangement, and a steering valve whose outlet is connected to the working connection arrangement, wherein the steering unit is made as an open-center steering unit, an inlet of the steering valve being connected to a pressure supply arrangement that can be activated by an activation of the steering valve, the pressure supply arrangement can be activated by a load-sensing signal from the steering valve.

14. The steering arrangement according to claim 13, wherein the steering valve and the steering unit have a common pressure control valve.

15. The steering arrangement according to claim 13, wherein the steering unit is connected to a change-over arrangement for changing over between a reaction and a non-reaction operation mode.

16. A hydraulic steering arrangement with a supply connection arrangement, a working connection arrangement connectable to a steering motor, a steering unit located between the supply connection arrangement and the working connection arrangement, and a steering valve whose outlet is connected to the working connection arrangement, wherein the steering unit is made as an open-center steering unit, an inlet of the steering valve being connected to a pressure supply arrangement that can be activated by an activation of the steering valve, the steering valve has a hydraulic actuator, a pilot controlled valve being located between the actuator and the supply connection arrangement.

17. The steering arrangement according to claim 16, wherein the steering valve and the steering unit have a common pressure control valve.

18. The steering arrangement according to claim 16, wherein the steering unit is connected to a change-over arrangement for changing over between a reaction and a non-reaction operation mode.

\* \* \* \* \*